United States Patent [19]

Donley

[11] Patent Number: 4,660,870
[45] Date of Patent: Apr. 28, 1987

[54] CLAMP

[76] Inventor: Nick J. Donley, P.O. Box 477, Lovington, Ill. 61937

[21] Appl. No.: 768,846

[22] Filed: Aug. 23, 1985

[51] Int. Cl.$^4$ .............................................. F16L 21/08
[52] U.S. Cl. .................................... 285/419; 285/328; 285/373; 285/420; 24/273
[58] Field of Search ............... 285/373, 409, 243, 419, 285/252, 411, 420, 21, 328; 138/49; 24/273, 20 TT, 24

[56] References Cited

U.S. PATENT DOCUMENTS

| | | | |
|---|---|---|---|
| 1,839,761 | 1/1932 | Hutton | 285/411 |
| 3,022,209 | 2/1962 | Campbell | 285/21 X |
| 4,183,560 | 1/1980 | Wyss | 285/328 |
| 4,465,309 | 8/1984 | Nimke et al. | 285/373 |
| 4,465,330 | 8/1984 | DeCenzo | 285/409 |

FOREIGN PATENT DOCUMENTS 1169942  11/1969  United Kingdom ................ 285/373

Primary Examiner—Dave W. Arola
Attorney, Agent, or Firm—Paul H. Gallagher

[57] ABSTRACT

A band that is discontinuous circumferentially, placeable on an object to be clamped in transverse direction; toggle locking means releasably locks the ends of the band together on the object. In one form the band is made in parts hinged together, and in another, it is a single piece of flexible material. The clamp, in another form includes an inner band forming a sealing gasket. In still another form, a repair band is included, which is applied to the object, and when the clamp is removed, the repair band remains as a unitary repair component on the object. The clamp is also operable in repairing broken bones.

5 Claims, 18 Drawing Figures

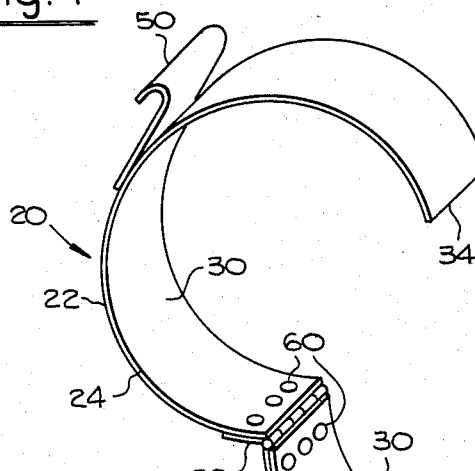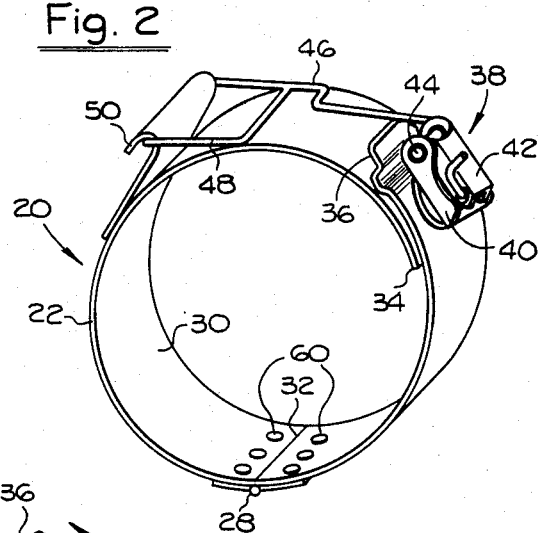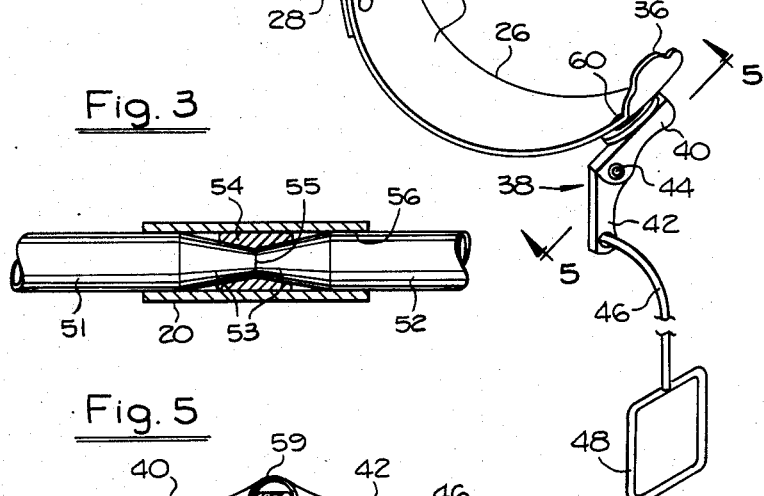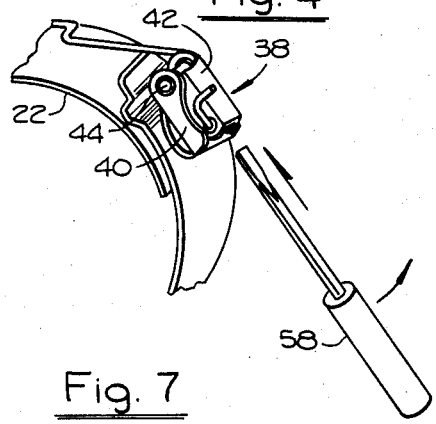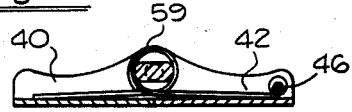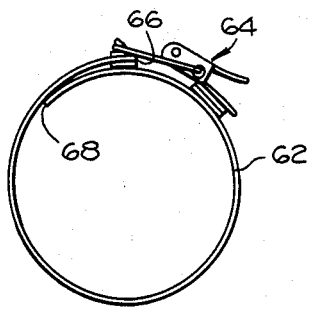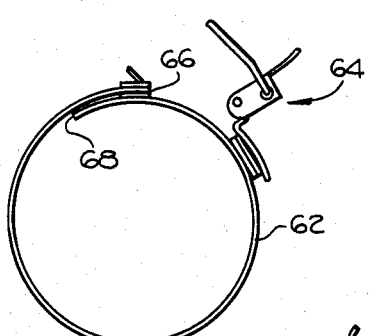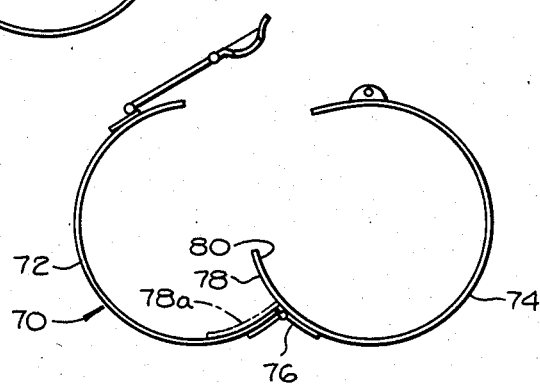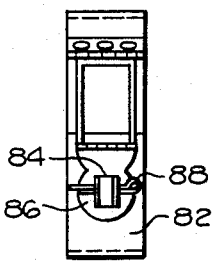

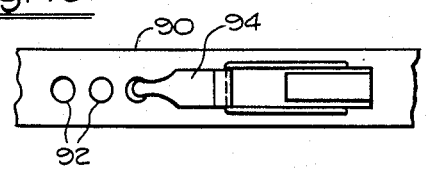
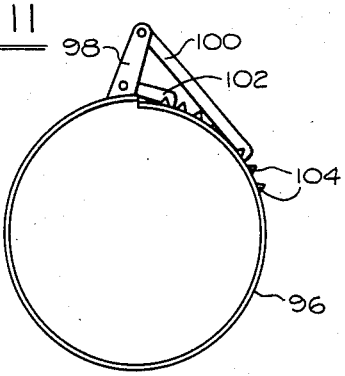
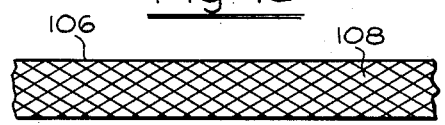
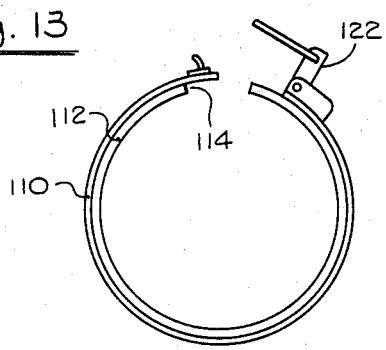
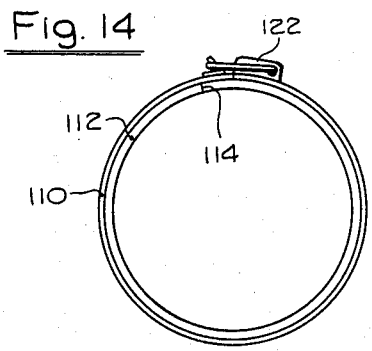
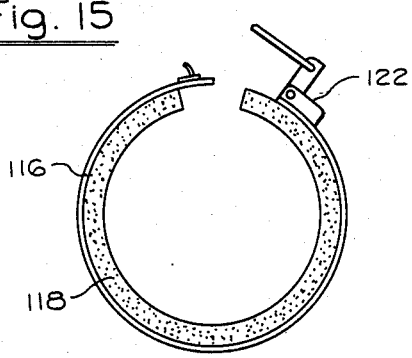
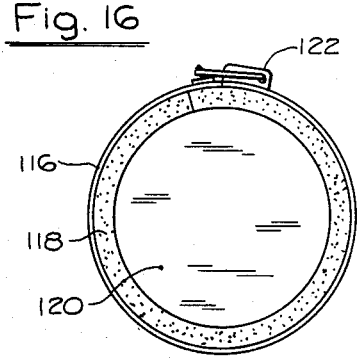
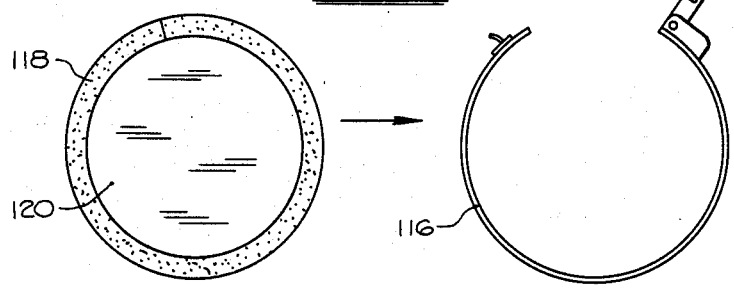
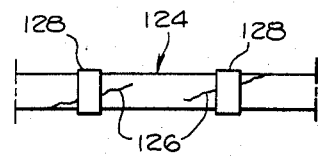

CLAMP

FIELD OF THE INVENTION

The invention resides in the field of clamps, and has to do particularly with that kind of clamp that completely surrounds the object to be clamped. Examples of such objects are hoses to be clamped on pipes, articles to be repaired, such as those that have been split or broken into parts and it is desired to bind them into whole articles, such as bones that have been fractured or broken, and applying an adhering band to an article.

OBJECTS OF THE INVENTION

A broad object of the invention is to provide a clamp of such character as to entirely surround the object to be clamped, having the following features and advantages:

1. It can be parted so as to enable it to be put on an endless object, such as a hose fitted on a pipe.

2. It is quick-acting, enabling it to be quickly put in place on an object, and clamping it, and to be quickly removed therefrom.

3. It can be brought into tight clamping position, by a single clamping movement, in contrast to a laborious maneuver such as threading a bolt/nut device.

4. It is of such simple design and construction as to greatly facilitate movements in a cramped space in putting it in position for clamping, and manipulating it for clamping, when in that position.

5. It is particularly effective in clamping bones that have been fractured or broken, enabling the bone to be entirely surrounded and gripped or clamped at all points therearound.

6. It is adapted to be provided with special gripping surface for producing a more effective clamping result.

7. It includes, in one form, an adhering band applied to the object to be clamped in surrounding relation thereto, and clamped at all points therearound, and after a period enabling the band to adhere to the object, enabling the clamp to be removed, leaving the adhering band on and forming a unitary part, and effectively integral, of the object being clamped.

DESCRIPTION OF CERTAIN PREFERRED EMBODIMENTS

In the drawngs,

FIG. 1 is a perspective view of one form of clamp made according to the present invention, shown in open position.

FIG. 2 is a side view of the clamp of FIG. 1, in closed position.

FIG. 3 is a fragmentary view of a clamp applied to a hose.

FIG. 4 is a detail view with the top portion of the clamp of FIG. 2, showing the use of an instrument in opening the clamp lock.

FIG. 5 is a sectional view taken at line 5—5 of FIG. 1, showing the spring means biasing the toggle lock to open position.

FIG. 6 is a side view of a modified form of clamp, including a flexible one-piece band, in open position.

FIG. 7 is a view of the clamp of FIG. 6 in closed position.

FIG. 8 is a side view of a clamp embodying another form of the invention, shown in open position.

FIG. 9 is a detail view of a modified form of locking means for the clamp.

FIG. 10 is an elevational view of a detail of an adjustable form.

FIG. 11 shows a modified form of invention including a ratchet in the locking means.

FIG. 12 is a face view of the inner surface of the band of a clamp, showing a knurled surface.

FIG. 13 is a side view of a clamp including a resilient gasket, in open position.

FIG. 14 is a view of the clamp of FIG. 13 in closed position.

FIG. 15 is a view of a clamp, in open position, including a self repair band to be applied to an object.

FIG. 16 is a view of the clamp of FIG. 15 applied to the object, and in closed position.

FIG. 17 is a view of the object and clamp, of FIG. 16, with the clamp removed and the repair band remaining on the object.

FIG. 18 is a view of a fragment of a broken bone, with clamps of the present invention applied thereto.

Referring in general to the invention, the clamp is of split type, including a band that is not circumferentially continuous, but split, forming ends facing generally toward each other, in circumferential direction. The band can be manipulated for spreading the ends to provide a gap or opening for receiving the object to be clamped, that is, the band can be fitted on the object in transverse direction, it not being necessary to fit it longitudinally over the end of the object. Many objects to be clamped do not include free ends, over which a clamp can be fitted, but are connected to other objects, in endless fashion, and therefore any clamp to be applied thereto must be so applied by opening the clamp and fitting it in position transversely.

The clamp of the invention, with respect to the split feature, includes two main types, one in which the band is made up of parts hinged together, and in the other the band is flexible, enabling the band to be flexed for spreading the end elements.

Referring in detail to the drawings, attention is directed first to FIGS. 1 and 2, showing one form of clamp, in open and closed positions respectively. The clamp is indicated in its entirety at 20 and includes a band 22 which in a preferred form is of spring steel, possessing a great degree of flexibility. In this form the band is made up of two parts 24, 26 hinged together by a suitable hinge means 28, the inner surface 30 of which continues up to the parting line 32 at the hinge means.

The band 22 has end elements 34, 36 which overlap in the closed position of the clamp (FIG. 2), the inner surfaces of which nearly merge, forming a continuing smooth surface except for the thickness of the inner one of the end elements.

Mounted on the end elements of the band is a toggle locking means 38, which includes a pair of levers 40, 42 pivoted together on a pin 44. One of the levers is secured to one of the end elements, e.g., 40, and secured to the outer end of the other lever is a link 46. This link 46 is pivoted in the extremity of the lever 42 and has a loop 48 which is releasably secured to a hook 50 secured to the other part 24 of the band. The various elements or components that are secured to the band, such as the hinge means, locking means, etc., are so mounted by rivets 60 that are flush with the inner surface of the band, lying in the smooth surface thereof.

The clamp itself, considered detached from an object to be clamped, is movable between the closed position of FIG. 2 to the open position of FIG. 1, and in the use of the device it is fitted, when in open position, over the object to be clamped. As noted above, this is of particular importance in use with objects that do not have detached ends over which the clamp may be fitted. A very common example of that kind of device is a hose fitted on pipes. A more specific example of the use of the clamp, is in motorcycles, where such hose/pipe connections are used, and in which the space is very limited, making it extremely difficult to reach the space desired and apply clamps.

FIG. 3 shows the use of the clamp for securing the butting ends of pipe elements. The pipe elements 51, 52 are in end-to-end position, butting or nearly so. The ends thereof are tapered as at 53, and an O-ring gasket 54 is fitted on the tapered portions, over the parting line 55 and then the clamp 20 is clamped over the gasket, engaging the large diameter portions of the pipe elements as at 56. The clamp is easily applied, as indicated above, being opened and fitted thereover in transverse direction.

After the clamp is put in position, the toggle locking means is moved back to locking position, and locked, drawing the band up tight into clamping position. It will be understood of course that this type of clamp, or split type, finds many uses, in addition to a motorcycle.

Preferably the toggle lock 38 (FIG. 4) is provided with an opening at the free end of one of the levers, e.g., 40, in which an instrument such as a screwdriver 58 can be inserted and used for prying the lever to open position. The locking means (FIG. 5) may be provided with spring means 59 biasing the levers 40, 42 to closed position.

While the preferred form of clamp is made of parts hinged together, as in FIGS. 1 and 2, it is also within the scope of the invention to make the band of a single flexible piece, such as in FIGS. 6 and 7. In this form the band 62 is continuous and the toggle locking means 64 is mounted thereon in a manner similar to that of FIGS. 1 and 2. The band 62 is sufficiently flexible to enable the end elements 66, 68 thereof to be separated widely to enable the band to be fitted over an object that is relatively large.

Attention is next directed to the modified form of clamp of FIG. 8. The clamp of FIGS. 1 and 2, made up of hinged parts, provides an inner surface that is smooth up to the parting line 32, and in most cases is in effect continuous across that parting line. In certain cases, however, the clamp may not fit perfectly on the object to be clamped, and the parts of the band may be slightly separated at the parting line. To overcome this possible difficulty, the clamp of the invention may be made as represented in FIG. 8. In this case the clamp includes a band 70 made up of two parts 72, 74 hinged together by hinge means 76. The band part 74 is provided with an extension 78 having an inner surface 80 which is continuous with the inner surface of the band part 74. When the clamp is moved to closed position, the extension 78 lies against the part 72 as indicated by the dot-dash line 78a. This surface 80 merges into the inner surface of the band part 72 and provides a smooth surface extending across the hinge.

FIG. 9 shows a means for providing additional locking effect, of the clamp in closed position. The band part 82 is provided with a loop 84 over which a hasp 86 is fitted, and a cotter pin 88 is inserted through the loop for holding the hasp in place.

FIG. 10 shows a construction providing for adjustable sizes of clamp, within limits. The band 90 is provided with a series of longitudinally spaced holes 92 and one of the levers of the toggle locking means is provided with a hook 94 which is fitted into a selected one of the holes. The other lever of the hook is secured to the other band part.

FIG. 11 shows a clamp having a ratchet means for drawing up the band of the clamp. In this figure the clamp is indicated at 96. A toggle locking means is provided on the band, having a pair of levers, one of which indicated at 98, and also having a pair of hooks 100, 102 pivoted on the lever at different points and working on teeth 104 on the other band part semicolon by reciprocating the lever 98, the loops 100, 102 work in the usual fashion on the teeth and draw up the band.

FIG. 12 shows a clamp band 106 having knurling 108 on its inner surface, to more effectively grip the clamped object.

FIGS. 13 and 14 show a clamp 110 provided with a yieldable lining 112 providing a sealing gasket on the object being clamped. In the clamping position of this clamp, the ends of the liner interengage at 114 to provide sealing entirely around the object.

FIGS. 15–17 show an arrangement for applying an adhering band, or repair band, on the object being clamped. The clamp band, in this case, 116, is provided with a strip of material 118 which may be in the form of a lining on the band. This material 118 is a strong fibrous material, such as fiber glass, impregnated with a binding material, in moist or liquid form. The clamp is applied to the object 120 and drawn up by it against the object by the locking means 122. After a predetermined period of time, the binding material sets and the repair band becomes a permanent element, unitary and effectively integral with the object. The clamp ordinarily is not removable, remaining on the object.

The clamp of the invention is effective in healing broken or splintered bones. In this connection attention is directed to FIG. 18 showing such a bone 124 having breaks or splinters at 126. Clamps 128, such as the clamp of FIGS. 1 and 2, are placed on the bone at various points therealong to hold the bone in drawn up and set position, until the breaks are healed.

I claim:
1. A clamp comprising,
a band of flexible material including a pair of parts having inner and outer ends respectively,
hinge means hingedly securing the parts together at their inner ends, and the outer ends forming end elements of the band,
the band having inner and outer surfaces,
the hinge means positioned on the outer surface of the band and one of the parts having an inner end circumferential extension extending beyond the hinge means and providing a continuous inner surface over the hinge means,
the parts being relatively movable into and out of a closed position in which they form a circumferentially continuous band,
the clamp including toggle locking means having components mounted respectively on the outer ends of the band parts and operable when manipulated for drawing the band parts together,
one of the band parts having an outer end circumferential extension positioned inwardly of and in engagement with the inner surface of the outer end of the other band part when the band parts are in closed position.

2. A clamp according to claim 1 wherein, said inner and outer circumferential extensions are on the same band part whereby that band part forms the greater part of a complete circumference.

3. A clamp according to claim 2 wherein, the band parts move on a fixed axis and the inner circumferential extension overlies the parting line between the band parts in all positions of movement of the band parts into and out of said closed position.

4. A clamp according to claim 1 wherein, the band is formed with a knurled inner surface providing increased gripping action by the band on the object being clamped.

5. A clamp according to claim 1 and including, ratchet means operably interposed between the locking means and the band, and the locking means being operable, in response to manual actuation of the locking means, and thereby actuation of the ratchet means, for drawing up the end elements, and thus the band, and tightening the band in clamping relationship to the object.

* * * * *